United States Patent [19]
Welch, II et al.

[11] Patent Number: 5,212,211
[45] Date of Patent: May 18, 1993

[54] POLYMODAL-CURE SILICONE COMPOSITION, AND METHOD OF MAKING THE SAME

[75] Inventors: Edward K. Welch, II, Bristol; Robert P. Cross, West Simsbury; David I. Crossan, Hebron; Hsien-Kun Chu, Wethersfield, all of Conn.

[73] Assignee: Loctite Corporation, Hartford, Conn.

[21] Appl. No.: 615,185

[22] Filed: Nov. 19, 1990

[51] Int. Cl.$^5$ ............... C08F 2/50; C08G 77/14; C08G 77/20; C08G 77/16

[52] U.S. Cl. ............... 522/37; 522/40; 522/44; 522/46; 522/99; 522/172; 528/31; 528/32; 528/34

[58] Field of Search ............... 522/99, 172, 37, 40, 522/44, 46; 528/31, 32, 34

[56] References Cited

U.S. PATENT DOCUMENTS

| | | | |
|---|---|---|---|
| 4,503,208 | 3/1985 | Lin et al. | 528/15 |
| 4,504,629 | 3/1985 | Lin et al. | 525/288 |
| 4,563,539 | 1/1986 | Gornowicz et al. | 556/421 |
| 4,575,545 | 3/1986 | Nakos | 528/15 |
| 4,575,546 | 3/1986 | Klemarcyzk et al. | 526/245 |
| 4,665,147 | 5/1987 | Lien et al. | 528/15 |
| 4,675,346 | 6/1987 | Lin et al. | 522/39 |
| 4,699,802 | 10/1987 | Nakos et al. | 528/34 |
| 4,845,249 | 7/1989 | Arai et al. | 556/440 |
| 4,952,711 | 8/1990 | Jacobine et al. | 522/99 |

FOREIGN PATENT DOCUMENTS

| | | |
|---|---|---|
| 0240162 | 10/1987 | European Pat. Off. . |
| 262806 | 4/1988 | European Pat. Off. . |
| 273565 | 7/1988 | European Pat. Off. . |
| 276986 | 8/1988 | European Pat. Off. . |
| 332400 | 9/1989 | European Pat. Off. . |
| 348106 | 12/1989 | European Pat. Off. . |
| 363071 | 4/1990 | European Pat. Off. . |
| 3708958 | 9/1988 | Fed. Rep. of Germany . |
| 63-10632 | 1/1988 | Japan . |
| 63-117024 | 5/1988 | Japan . |
| 63-179881 | 7/1988 | Japan . |
| 63-185989 | 8/1988 | Japan . |
| 2-110121 | 10/1988 | Japan . |
| 1-14226 | 1/1989 | Japan . |
| 1-279912 | 11/1989 | Japan . |
| 1-301708 | 12/1989 | Japan . |
| 1-304108 | 12/1989 | Japan . |
| 1-318028 | 12/1989 | Japan . |

OTHER PUBLICATIONS

"Synthesis of Organosilicon Esters of Hydrazino Carboxylic Acids," Gol'din, G. S., et al, Zhrunal Obshchei Khimii, vol. 43, No. 4, pp. 781-784, Apr. 1973.

*Primary Examiner*—Marion E. McCamish
*Assistant Examiner*—Susan Berman
*Attorney, Agent, or Firm*—Steven J. Hultquist

[57] ABSTRACT

An acryloxy-functional capped silicone formed as a reaction product of:
(i) a silyl diacrylate compound of the formula

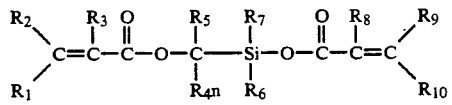

wherein: $R_1$, $R_2$, $R_3$, $R_4$, $R_5$, $R_6$, $R_7$, $R_8$, $R_9$, and $R_{10}$ are independently selected from hydrogen, halo, and organo radicals; and n is an integer having a value of from 1 to 4; and
(ii) a silicone having (A) functionality which is reactive with an acryloxy functionality of the silyl diacrylate compound, and (B) additional functionality imparting (directly or by reaction with a co-reactant) further curability to the silicone by another modality (e.g., moisture curability, heat curability, etc.)

The capped polyfunctional silicone may suitably be formulated with (a) an effective amount of a photoinitiator for partial curing of the acryloxy-functional capped silicone under photoinitiating curing conditions, and (b) suitable curatives, initiators, accelerators, etc., as necessary or desirable for further curing by other cure mechanisms dissociated with the additional functionality (ii) (B). The compositions of the invention are usefully employed as adhesives, sealants, conformal coatings, potting materials, and the like.

32 Claims, No Drawings

POLYMODAL-CURE SILICONE COMPOSITION, AND METHOD OF MAKING THE SAME

CROSS-REFERENCE TO RELATED APPLICATIONS

Co-filed concurrently herewith are U.S. application No. 07/615,200 in the names of Hsien-Kun Chu, Robert P. Cross, and David I. Crossan, for "PHOTOCURABLE SILICONE COMPOSITION, AND METHOD OF MAKING THE SAME," and U.S. application No. 07/615,186 in the names of Hsien-Kun Chu, Robert P. Cross, and David I. Crossan, for "PHOTOCURABLE SILICONE GEL COMPOSITION, AND METHOD OF MAKING THE SAME " both now allowed.

BACKGROUND OF THE INVENTION

1. Field of The Invention

This invention relates generally to polymodal-cure resin compositions, and more specifically to a polymodal-cure silicone composition comprising an acryloxy-functional capped silicone, and to a method of making same.

2. Description of The Related Art

In the field of silicone chemistry, a variety of silicone compounds, polymers, and formulations have been developed for applications including sealants, conformal coatings, potting materials, and the like. Among the numerous silicone systems developed to date, a wide variety of moisture-curing silicone compositions have evolved, which depend for their cure on atmospheric humidity and/or moisture present on the substrate to which the composition is applied. Although such moisture-curing silicone systems provide good physical properties and performance when fully cured, they suffer the disadvantage that the moisture curing process is relatively slow.

In consequence, effort has been focused in recent years on silicone compositions having other curing modalities which are significantly faster than the moisture-curing process. In particular, photocurable (e.g., UV-curable) silicones have been developed which offer a fast curing speed, far superior to conventional moisture-curing silicones.

In one such UV-curing silicone system which has come into wide usage, a photocurable silicone polymer is prepared by reacting (a) an isomeric mixture of acryloxypropenyldimethylchlorosilane, comprising the isomers:

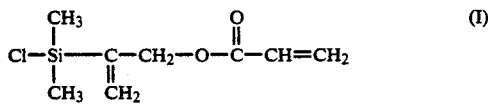

and

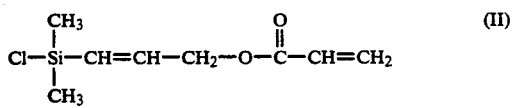

wherein the isomer (I) is present at a concentration of about 75%-80% by weight of the isomeric mixture, and isomer (II) constitutes the balance thereof, with (b) a hydroxyl-terminated dimethylsilicone fluid of suitable molecular weight, e.g., 20,000–40,000 weight average molecular weight, to yield an acrylic-functional capped silicone polymer. The acrylic-functional capped silicone polymer then is compounded with filler, stabilizer, and a suitable photoinitiator such as benzophenone, to yield a photocurable silicone composition which is very rapidly cured in exposure to UV or other suitable actinic radiation.

The acrylic-functional capper employed to prepare the photocurable silicone polymer described above is typically prepared by selectively hydrosilylating propargyl acrylate at the propargyl group with dimethylchlorosilane. Subsequently, in the endcapping of the hydroxyl-terminated dimethylsilicone fluid using the resulting isomeric mixture described above, hydrogen chloride is generated, necessitating the addition of a basic hydrogen chloride acceptor, e.g., an amine, to the reaction volume. The amine or other acid acceptor functions to prevent the acid from catalyzing the reversion of the dimethylsilicone fluid.

While the above photocurable silicone system functions satisfactorily in many applications and has enjoyed wide commercial usage, it nonetheless suffers from several serious problems.

First, and of utmost importance, propargyl acrylate and its precursor, propargyl alcohol, are highly toxic, and thus require precautionary measures in handling and exposure, to ensure safety in their use.

Second, the process employed to make the acrylic-functional capper is complex and expensive. Propargyl alcohol is first esterified to make the propargyl acrylate, and the acrylate then is carefully hydrosilylated to form the acrylic-functional capper.

Third, the capping process, with a base such as an amine being employed as the hydrogen chloride acceptor, generates a base-complexed hydrochloride which is a solid. The formation of this solid complex necessitates the difficult step of filtering the solid from the viscous polymer, which adds to the cost of the process and the photocurable silicone product.

Fourth, the acrylic-functional capper comprises a constituent, viz., the isomer of formula (I) above, which, as a β-oxygenated silicon compound, is readily susceptible to undergoing β-elimination reaction. For a discussion of β-elimination chemistry, see C. Eaborn, "Organosilicone Compounds", Butterworths Scientific Publications, London, 1960, pp. 137-138. Thus, the isomer (I) of the capper mixture may undergo β-elimination reaction to split off allene, thereby rendering the acrylic-functional capper unstable. Further, the resulting photocurable silicone composition comprising the photocured acrylic-functional capped silicone polymer may likewise be unstable due to the presence of the beta-oxygenated silicon linkage therein.

Accordingly, it would be a significant advance in the art to provide a photocurable silicone gel composition which can be made without highly toxic reagents in a relatively simple and economic manner, does not require filtering of a viscous polymer product, and comprises a silicone polymer which is capped with an acrylic-functional capper having no β-oxygenated silicon linkages in its structure.

With respect to the photocurable silicone composition and process of making same which constitute aspects of the present invention and are more fully described hereinafter, related art to the present invention is discussed below.

"Synthesis of Organosilicon Esters of Hydrozino Carboxylic Acids," G. S. Gol'din, et al, *Zhurnal Obsh-*

*chei Khimii*, Vol. 43, No. 4, April, 1973, pp. 781–784, discloses the synthesis of 1,3-bis[(acryloyloxy)methyl]- and 1,3-bis[(methacryloyloxy)methyl]-1,1,3,3-tetramethyldisiloxanes by heating mixtures of chloro(chloromethyl)dimethylsilane with acrylic and methacrylic acids in the presence of triethylamine as hydrogen chloride acceptor, with subsequent hydrolysis of the silyl ester:

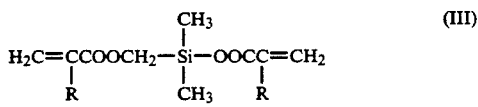

wherein R=H or $CH_3$.

U.S. Pat. No. 4,845,259 to M. Arai, et al, assigned to Shin-Etsu Chemical Company, Ltd., and Shin-Etsu's Japanese Kokai Tokkyo Koho JP 01 14226, JP 63 179881, JP 63 185989, and European Patent Application EP 276986, describe the synthesis of a silyl acrylic acid diester of formula (III) above, by reacting potassium or sodium salts of acrylic acid with chloromethyldimethylchlorosilane. Such synthesis, however, has the disadvantage that the acrylic acid salts employed therein are relatively expensive. In accordance with the teachings of these patents, the silyl diacrylate compound (III) is hydrolyzed to form a silanol capper of the formula:

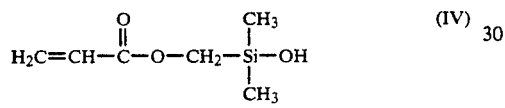

Contemporaneously, dimethylchlorosilane is reacted, in the presence of a platinum hydrosilation catalyst, with a vinyl-terminated dimethylsiloxane polymer to yield a product silicone polymer with chloro terminal groups. The silicone polymer is reacted with the silanol capper in the presence of amine to yield an acryloxy methyl-terminated polymer of the formula:

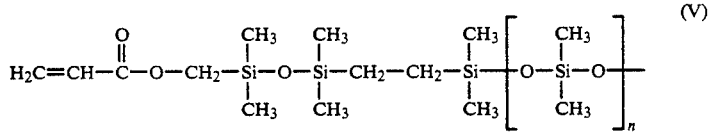

and thereafter the product is filtered to remove the concurrently formed amine hydrochloride complex therefrom.

U.S. Pat. No. 4,563,539 to G. A. Gornowich, et al describes UV-curable acrylofunctional silicones which are formed by reaction of aminoalkyl or diaminoalkyl silicones with isocyanato acrylates.

Other relevant acrylic functional silicone references include: U.S. Pat. No. 4,503,208 (preparation of acrylate and 2-alkyl acrylate silicones which are curable by UV exposure, heat, or anaerobic conditions, by hydrosilation of an acrylate or 2-alkyl acrylate ester of an acetylenic alcohol with silicon hydride functional silicones); U.S. Pat. No. 4,575,546 (radiation-curable silicone polymers with a plurality of acrylic groups clustered at or near the chain ends thereof); U.S. Pat. No. 4,575,545 (same); U.S. Pat. No. 4,675,346 (silicone resin with terminal acrylic groups and intermediate region free of acrylic groups, formulated with fumed silica filler and photoinitiator, and curable by UV radiation); U.S. Pat. No. 4,504,529 (graft polymers having α-alkyl acrylate functionality, formed as a reaction product of a silicon hydride grafting agent with at least one α-alkyl acrylate group, and an aliphatically unsaturated polymer, e.g., a polyorganosiloxane); and U.S. Pat. No. 4,655,147 (methacrylated siloxanes prepared by hydrosilation of beta-(allyloxy)ethylmethacrylate using a silicon hydride functional siloxane).

Photocurable siloxane rubber compositions are described in Japanese Kokai Tokkyo Koho JP 01 301708, and European Patent Application 0 240 162 A2 describes liquid polyorganosiloxane compositions that cure by a hydrosilation reaction to yield optically transparent elastomers.

Accordingly, it is an object of the present invention to provide a photocurable silicone composition which may be synthesized using relatively low cost, readily available materials, which are relatively simple in synthesis procedure, and which avoid the necessity of filtering a highly viscous silicone polymer product to remove by-products therefrom.

It is another object of the invention to provide a photocurable silicone composition in which the silicone polymer is free of β-oxygenated silicon linkages, and whose synthesis can be carried out without highly toxic reactant materials.

Other objects and advantages will be more fully apparent from the ensuing disclosure and appended claims.

SUMMARY OF THE INVENTION

In one aspect, the present invention relates to a silicone (i) capped with acryloxy functional moieties derived from a silyl diacrylate capper of the formula:

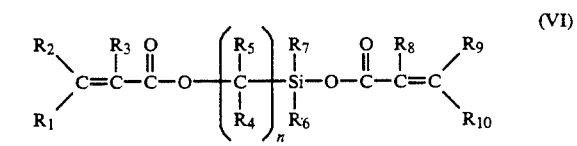

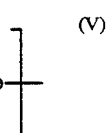

wherein:

$R_1$, $R_2$, $R_3$, $R_4$, $R_5$, $R_6$, $R_7$, $R_8$, $R_9$, and $R_{10}$ are independently selected from hydrogen, halo, and organo radicals; and n is an integer having a value of from 1 to 4;

whereby said resin is partially curable under radiation exposure conditions curingly effective therefor and optionally including the presence therewith of a photoinitiator, and (ii) having additional functionality imparting to the silicone at least one, e.g., a second, partial curing modality different from the partially curingly effective radiation exposure conditions constituting a first partial curing modality therefor.

The preferred silicones are those which are linear, and have terminal and/or pendant (1) acryloxy functionalilty and/or (2) additional functionality. They are generally represented by the following formula:

$$(R)_a \underset{(X)_b}{\overset{}{\text{Si}}}-O-\left(\underset{X}{\overset{R}{\text{Si}}}-O\right)_s\left(\underset{R}{\overset{R}{\text{Si}}}-O\right)_t \text{Si} \underset{(X)_d}{\overset{(R)_c}{}} \quad \text{(VII)}$$

wherein:

each R is independently a radical or moiety which is non-reactive in the end-use composition in which the silicone is to be employed, i.e., not reactive with the cure mechanisms to be employed in the end use of the silicone, e.g., each R may be hydrogen, halo, or organo, and preferably is organo selected from $C_1-C_8$ alkyl and phenyl, most preferably methyl;

each X independently is (i) an acryloxy functionality derived from the silyl diacrylate capper, or (ii) an additional functionality which is dependent upon a desired further cure modality;

each of a, b, c, and d is independently 0, 1, 2, or 3;

s is 0 or a positive integer, preferably less than 20, more preferably less than 8; and t is a positive integer;

provided that:

$(a+b)=(c+d)=3$;

$(b+d+s)$ is greater than or equal to 2; and the equivalents ratio of acryloxysilyl functionality (i) to additional functionality (ii) is from 0.1:0.9 to 0.8:0.2, except where the silicone in its end use is employed in combination with a second constituent which cures by another curing modality, in which case the ratio may be up to 1.0:0.0.

It is understood that in any given silicone polymer chain in the above general formula, all X's may be (i) acryloxy functionality, (ii) additional functionality, or a mixture of (i) acryloxy functionality and (ii) additional functionality.

In another aspect, the present invention relates to a silicone composition, formed as a reaction product of:

(i) a first silane of the formula:

$$\underset{R_1}{\overset{R_2}{}}C=\underset{R_3}{\overset{}{C}}-\overset{O}{\overset{\|}{C}}-O-\left(\underset{R_4}{\overset{R_5}{C}}\right)_n\underset{R_6}{\overset{R_7}{\text{Si}}}-O-\overset{O}{\overset{\|}{C}}-\underset{R_{10}}{\overset{R_8}{C}}=C\overset{R_9}{} \quad \text{(VI)}$$

wherein:

$R_1$, $R_2$, $R_3$, $R_4$, $R_5$, $R_6$, $R_7$, $R_8$, $R_9$, and $R_{10}$ are independently selected from hydrogen, halo, and organo radicals; and n is an integer having a value of from 1 to 4; and (ii) a silicone having (A) functionality which is reactive with an acryloxy-functionality of said silyl diacrylate compound to yield an acryloxy-functional capped silicone which is partially curable under first curing conditions comprising curingly effective radiation exposure conditions optionally including the presence of a photoinitiator, and (B) additional functionality which renders the acryloxy-functional capped silicone partially curable by further curing conditions different from the curingly effective radiation exposure conditions constituting the first curing conditions.

In another aspect, the invention relates to a photocurable silicone composition comprising the above-described acryloxy-functional capped silicone and an effective amount of a photoinitiator for partial curing of the acryloxy-functional capped silicone under photoinitiating radiation exposure curing conditions.

In a further aspect, the silicone functionality which is reactive with the acryloxy functionality of the silyl diacrylate compound may for example comprise a functionality selected from the group consisting of:

—OH;

—N(R')$_2$, wherein each of the R' substituents is independently selected from hydrogen and organo groups, with the proviso that at least one R' substituent is hydrogen;

—SH;

—SO$_3$H; and where residual acrylic acid functional groups are present, $$(R'')_2C\overset{O}{\overset{/\ \backslash}{\text{———}}}CR'''-O-,$$

wherein each of the R'' and R''' substituents is independently selected from hydrogen and organo groups.

In a preferred aspect, the silicone functionality which is reactive with the acryloxy functionality of the silyl diacrylate compound, may comprise a silicon-bonded functional group including a labile hydrogen constituent.

In a particularly preferred aspect, the aforementioned silyl diacrylate has the formula:

$$H_2C=\underset{R_{11}}{\overset{}{C}}-\overset{O}{\overset{\|}{C}}-O-CH_2-\underset{CH_3}{\overset{CH_3}{\text{Si}}}-O-\overset{O}{\overset{\|}{C}}-\underset{R_{12}}{\overset{}{C}}=CH_2 \quad \text{(VIII)}$$

wherein:

$R_{11}$ and $R_{12}$ are independently selected from H and methyl; and the silicone comprises a linear polydimethylsiloxane with terminal —OH groups.

Another aspect of the present invention relates to a cured silicone material produced by partially photocuring a silicone composition comprising the above-described acryloxy-functional capped silicone, under conditions photocuringly effective therefor, and then further curing the silicone composition under conditions which are curingly effective for the additional functionality of the silicone. For example, the further curing may involve moisture cure when the additional silicone functionality comprises hydrolyzable functionality such as alkoxy, oxime, or acetoxy groups. Alternatively, such additional functionality may impart further curability to the silicone by any suitable curing modalities, such as (a) ambient temperature curing, (b) elevated temperature curing, (c) reaction with curative species, (d) radiation exposure differing from the radiation exposure which is curingly effective for the acryloxy functionality of the capped silicone.

Still another aspect of the invention relates to a method of capping:

(i) a silicone having (A) an active hydrogen-containing functionality and (B) additional functionality which renders the capped silicone partially curable by curing conditions other than radiation exposure, with (ii) acrylic functionality, to render the silicone photocurable under radiation exposure optionally including the presence of a suitable photoinitiator therefor, comprising reacting the active hydrogen-containing functionality (A) of such silicone with a silyl diacrylate compound of the formula:

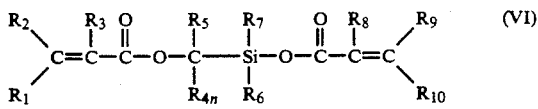

wherein:

$R_1$, $R_2$, $R_3$, $R_4$, $R_5$, $R_6$, $R_7$, $R_8$, $R_9$, and $R_{10}$ are independently selected from hydrogen, halo, and organo radicals; and n is an integer having a value of from 1 to 4.

In general, the above-described additional functionality of the silicone (sometimes hereinafter referred to as the "additional functionality"), i.e., functionality other than the acryloxy functionality of the silicone, may be any suitable functionality imparting the requisite further curing capability to the acrylic-capped silicone. A preferred further curing modality comprises moisture curing, and in such instance, the additional functionality imparting such moisture cure characteristics to the silicone may, by way of example, be selected from the group consisting of:

amino;
vinyl;
hydrogen;
enoloxy;
hydroxy;
alkoxy;
aryloxy;
oxime;
—OOCR$_{13}$;
N,N-dialkylamino;
N,N-dialkylaminoxy;
N-alkylamido;
—O—NH—C(O)—R$_{13}$;

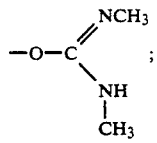

—O—C(CH$_3$)=CH$_2$; and
—S—C$_3$H$_6$Si(OCH$_3$)$_3$;
wherein R$_{13}$ is H or hydrocarbyl.

It is within the broad purview of the present invention:

(1) to utilize an acrylic capping compound (i.e., the silyl diacrylate compound) to functionalize and render partially photocurable a silicone which also contains additional functionality imparting a second curing modality to the acrylic capped silicone, as well as (2) to utilize additional reactant(s), e.g., additional cappers, with the acrylic capping compound reacted with the silicone, in order to impart functionality to the silicone by which the further curing thereof may be effected.

In other words, (i) the silicone prior to capping thereof with the acrylic capping compound may already have additional functionality permitting the subsequently capped reaction product (silicone) to be further cured by a particular additional curing modality, and/or (ii) the reaction of the acrylic capper and the silicone may be conducted with an additional co-reactant species which reacts with the silicone to yield additional functionality imparting a further cure modality to the silicone.

Other aspects and features of the present invention will be more fully apparent from the ensuing disclosure and appended claims.

DETAILED DESCRIPTION OF THE INVENTION, AND PREFERRED EMBODIMENTS THEREOF

The photocurable composition of the present invention is based on the surprising and unexpected discovery that acrylic-functional capper compounds of the formula:

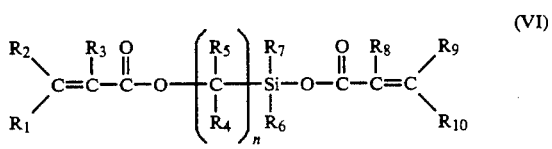

wherein:

$R_1$, $R_2$, $R_3$, $R_4$, $R_5$, $R_6$, $R_7$, $R_8$, $R_9$, and $R_{10}$ are independently selected from hydrogen, halo, and organo radicals; and n is an integer having a value of from 1 to 4, may be used to cap silanol or other active hydrogen-containing functionality on silicone polymers, by simply mixing the capper with the silicone polymer for a short period of time at ambient or relatively low elevated temperature, e.g., 100° C., preferably at ambient or room temperature.

For ease of reference in the ensuing discussion, the acrylic functional capper of formula (VI) above will sometimes hereinafter be denoted as the "silyl diacrylate compound", the "silyl diacrylate capper", the "acrylic capper", or the "first capper".

The highly efficient reaction of the capper with a silanol-ended silicone polymer is very surprising. It is generally perceived that monoacetoxysilanes at best will react with silanols only very sluggishly. It therefore is particularly unexpected that endcapping with this acrylic capper can take place at room temperature. Indeed, in the patent references of Shin-Etsu Chemical Company, Ltd., which were discussed hereinabove in the "Background of the Invention" section hereof, it is not even contemplated that such a facile reaction could take place. Instead, these references teach to hydrolyze the capper to prepare a silanol compound, contemporaneously with hydrosilylating a vinyl silicone polymer with a chloromethylsilane compound to yield a chloro-terminated silicone polymer which then is reacted with the silanol compound to yield an acrylic functionality-terminated silicone polymer. This extensive and circuitous synthetic route to achievement of an acrylic-functional terminated silicone polymer is based on the aforementioned general perception that monoacetoxysilanes will at best react with silanols only very sluggishly, and points up the substantial and unobvious character of the simple, economic methodology used for making a photocurable silicone in the broad practice of the present invention.

The silyl diacrylate capper may suitably be formed by the reaction of a chlorosilane compound and acrylic acid, and may subsequently be employed to form a photocurable silicone composition by reacting the capper with a silicone having (A) at least one functionality which is reactive with an acryloxy functionality of the silyl diacrylate capper, to yield an acryloxy-functional capped silicone, and (B) additional functionality which imparts to the acryloxy-functional capped silicone at least one partial additional curing modality different from the partially curingly effective radiation exposure conditions, which constitute a first partial curing modality for the acryloxy-functionalized silicone.

The additional functionality referred to above as imparting additional curing modality or modalities to the silicone molecule may be already present in the molecule at the time that the silicone is reacted with the capper. Alternatively, the silicone may be provided with such additional functionality at the same time as the silicone is reacted with the acrylic capper to form the acryloxy-functional capped silicone, or subsequently thereto. The additional functionality can either directly impart additional curing capability to the silicone, so that such functionality alone permits the silicone to cure by other cure mode(s), or else the additional functionality can indirectly impart additional curing capability to the silicone, as a precursor, intermediate, or co-reactant with another species, resulting in curing or curability of the silicone by other cure mode(s).

In a usefully employed synthesis method, the silicone is suitably polyfunctionalized, by reacting the silicone with the capper at the same time as the silicone is reacted with a co-reactant to provide the additional functionality on the silicone molecule. The additional functionality imparts to the capped silicone the capability of curing under conditions other than the radiation exposure conditions which are curingly effective for the silicone as a result of its capping by the silyl diacrylate compound.

Regardless of the specific synthesis methodology and reaction steps employed to functionalize the silicone for polymodal curing, there is provided a silicone which:

(i) is capped with acryloxy functional moieties derived from a silyl diacrylate capper of the formula:

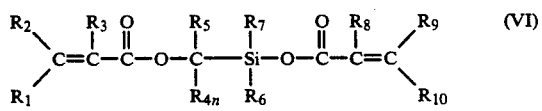

wherein:

$R_1$, $R_2$, $R_3$, $R_4$, $R_5$, $R_6$, $R_7$, $R_8$, $R_9$, and $R_{10}$ are independently selected from hydrogen, halo, and organo radicals; and n is an integer having a value of from 1 to 4, whereby the silicone is partially curable under radiation exposure conditions curingly effective therefor, and (ii) has additional functionality imparting to the silicone at least one, e.g., a second, partial curing modality different from the partially curingly effective radiation exposure conditions constituting a first partial curing modality therefor.

In such manner, the resulting capped and polyfunctionalized silicone is able to be partially cured by radiation exposure, which is partially curingly effective for the silicone by virtue of its acryloxy functional moieties (and optionally, and preferably, with a suitable photoinitiator being present), with the silicone also being partially curable by another (or other) curing mode(s), e.g., under curing conditions such as:

(a) ambient temperature exposure;
(b) moisture exposure;
(c) elevated temperature exposure;
(d) reaction with curative species; and
(e) radiation exposure differing from the radiation exposure which is curingly effective for the silicone by virtue of its acryloxy functionalization.

By way of example, the silicone may be additionally functionalized with oxirane functionality, such as cycloaliphatic epoxy groups, epoxidized novolak functionality, or glycidoxy groups. As is well known, a wide variety of curing conditions and curatives may be employed to cure various epoxy materials, as described in "Epoxy Resins, Chemistry and Technology," May and Tanaka, Marcel Dekker, Inc., New York (1973), hereby incorporated by reference. Heat-curing epoxy functionality may be employed with conventional heat-activated epoxy curatives, as for example:

(i) Lewis acid (cationic) catalysts, such as boron trifluoride amine complexes, e.g., boron trifluoride monoethyl amine, as well as the metal halides of tin, aluminum, zinc, boron, silicon, iron, titanium, magnesium, and antimony, and the like;

(ii) acid anhydrides, such as hexahydrophthalic anhydride, tetrahydrophthalic anhydride, nadic methyl anhydride, dodecenyl succinic anhydride, and the like;

(iii) imidazoles, such as derivatives of 2-phenyl imidazole, and derivatives of 1-cyanoethyl-2-phenylimidazole, and the like;

(iv) dicyanodiamide, optionally in combination with accelerators such as phenyl methyl urea or piperidine;

(v) latent amine curatives, such as the modified polyamide disclosed in U.S. Pat. No. 4,459,398 and available from Ciba Geigy as Hardner HT939;

(vi) amines per se, e.g., tertiary amines such as pyridine, 2,4,5-tris(dimethylaminoethyl)phenol, benzyldimethylamine, and triethylamine, and secondary amines such as piperidine, diethanolamine, and the like; and (vii) dissociable amine salts, such as the tri(2-ethylhexanoate) salt of tris(dimethylaminomethyl)phenol, and the like.

Silicones with oxirane functionality may also be cured at ambient temperature conditions using a variety of known and commercially available curatives.

Another class of additional functional groups which may be provided on the capped silicone molecule comprises moisture-curing functionality, e.g., alkoxy, enoloxy, amine, acetoxy, oxime, etc., cured by exposure at ambient conditions, e.g., in the presence of atmospheric moisture.

Another class of functional groups imparting additional partial curability to the capped silicone molecule comprises isocyanate functionality, by which the capped silicone may be cured in the presence of active hydrogen-containing compounds. The active hydrogen compounds may for example be silanols, polyesters prepared from polycarboxylic acids and polyhydridic alcohols, polyhydric polyalkylene ethers having at least two hydroxy groups, polythioether glycols, polyester amides, etc.

Further class of additional functionality which may be potentially suitable for imparting partial cure characteristics to the capped silicone molecule comprises vinyl functionality. The vinyl-containing capped silicone resin may be usefully employed with a cross-linking agent such as a hydride-containing resin or a hydrogen-containing polysiloxane, and may be cured at room temperature in the presence of a platinum catalyst.

Still other functional groups which may be usefully employed as the additional functionality of the capped silicone molecule include alkyd and aminoplast moieties.

It will be recognized that the foregoing classes of additional functionality for the capped silicone in the broad practice of the present invention, are illustrative only and that any other effective functionality or functional groups, which are compatible with the capped silicone and other constituents of the formulation in which the capped silicone ultimately is used, and which do not preclude the utility of the silicone, may advantageously be employed.

Moisture-curing, acryloxy-capped silicones are a preferred multifunctionalized silicone species within the broad scope of the present invention. It may be advantageous, depending on the specific identity of the functionality imparting moisture curability to the silicone, to include a moisture curing catalyst, such as an orthotitanate catalyst, in compositions containing the radiation-curable/moisture-curable silicone. Where the moisture cure (hydrolyzable) groups are methoxy or other hydrocarbyloxy groups, such catalysts are generally necessary to achieve cure. On the other hand, where the hydrolyzable groups are amino, such catalysts may not be necessary.

Radiation-curable/moisture-curable capped silicones in the practice of the present invention may for example comprise as the moisture cure-imparting functionality the following functional groups, which preferably are bound to silicon atoms in the silicone:

amino;
alkoxy;
acetoxy;
vinyl;
hydrogen;
hydroxy;
acryloxy;
oxime (i.e., $-ON=C(R^3)_2$);
$-OOCR_{13}$;
N,N-dialkylamino;
enoloxy;
N,N-dialkylaminoxy;
N-alkylamido;
$-O-NH-C(O)-R_{13}$;

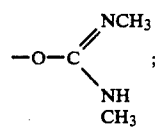

$-O-C(CH_3)=CH_2$; and
$-S-C_3H_6Si(OCH_3)_3$;
wherein $R_{13}$ is H or hydrocarbyl.

Most preferably, the hydrolyzable functionality imparting moisture curability to the acryloxy-functionalized silicone comprises methoxy or acetoxy functionality.

In instances where the silicone is functionalized for moisture curability, concurrently with the capping of the silicone with acryloxy, the co-reactant which is employed to impart the additional moisture-curing functionality to the silicone may suitably comprise a silane cross-linker compound, e.g., a silane compound having at least two functional groups per molecule independently selected from alkoxy, amine, enoloxy, oxime, acetoxy, etc., and which is reactive with the silicone to yield the correspondingly moisture-curable functionalized silicone.

For example, the silicone being functionalized with a moisture-curing functionality may suitably comprise a silanol-functionalized polydiorganosiloxane, and the co-reactant therewith may be a silane cross-linker of the formula:

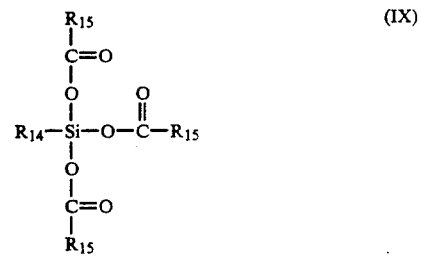

wherein: $R_{14}$ is $C_1-C_8$ alkyl, or

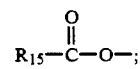

and each $R_{15}$ is independently selected from hydrogen and $C_1-C_8$ alkyl.

Another illustrative co-reactant cross-linker which may be usefully employed to impart moisture curability to a silicone containing silanol groups, or other functionality reactive with the cross-linker, comprises vinyl-trimethylethylketoximosilane.

As a further, more specific example, the starting silicone material may comprise a silanol-functionalized polydimethylsiloxane, and the moisture cure-functionalizing co-reactant may comprise ethyltriacetoxysilane, as a result of which the silicone reaction product is functionalized with acetoxy functionality.

Other cross-linker co-reactant species potentially useful for moisture-curably functionalizing the silicone in the broad practice of the present invention are well-known in the moisture-curing silicones art and are readily commercially available.

Although the foregoing discussion of additional cure functionality has been directed to the preferred silicone having further moisture-curing capability in addition to radiation exposure curability, it will be recognized that the silicones of the invention may be otherwise functionalized for further curability, e.g., with members of the classes of functional groups hereinabove described, and that the silicones may be polyfunctionalized for more than two cure modalities. For example, silicones may be multifunctionalized for concurrent or sequential curing, such as by:

(i) radiation curing, (ii) moisture-curing, and (iii) heat curing;

(i) radiation curing, (ii) anaerobic curing, and (iii) moisture curing; etc.

Among the silyl diacrylate capper compounds employed to functionalize the silicone for radiation curability in the broad practice of the invention (i.e., the silyl diacrylate compounds of the general formula (VI) set out broadly hereinabove), a particularly preferred class of such compounds includes those in which $R_1$, $R_2$, $R_3$, $R_4$, $R_5$, $R_8$, $R_9$, and $R_{10}$ are independently selected from hydrogen, halo, and $C_1$-$C_8$ alkyl radicals, and $R_6$ and $R_7$ are independently selected from hydrogen, halo, phenyl, and $C_1$-$C_8$ alkyl radicals. In this preferred class of compounds, n suitably has a value of 1 to 2, and most preferably n is 1. When n is 2, the silyl diacrylate capper is a β-oxygenated silicon compound.

As mentioned hereinabove, β-oxygenated silicon compounds have a susceptibility to undergoing β-elimination reaction, but despite this potential occurrence, β-oxygenated silyl diacrylate cappers of the present invention nonetheless are markedly superior to prior art β-oxygenated silicon capper compounds (e.g., the prior art capper compound of formula (I) described in the "Background of the Invention" section hereof) with respect to their ease of synthesis, and the economic advantages and time savings associated therewith.

In any event, to minimize stability problems, n in the silyl diacrylate capper compounds of the present invention may suitably have a value of 1, 3, or 4.

A more specific class of preferred compounds of formula (VI) includes compounds in which: $R_1$, $R_2$, $R_9$, and $R_{10}$ are hydrogen; $R_3$, $R_4$, $R_5$, and $R_8$ are independently selected from hydrogen and $C_1$-$C_8$ alkyl; $R_6$ and $R_7$ are independently selected from $C_1$-$C_8$ alkyl and phenyl; and n is 1.

A particularly preferred class of compounds of formula (VI) includes compounds in which: $R_1$, $R_2$, $R_4$, $R_5$, $R_9$, and $R_{10}$ are hydrogen; $R_3$ and $R_8$ are independently selected from hydrogen and methyl; $R_6$ and $R_7$ are methyl; and n is 1.

The silicone which is reactive with the silyl diacrylate capper to form the acryloxy-functional capped silicone of the invention, suitably has a silicone functionality which is reactive with an acryloxy functionality of the silyl diacrylate capper to provide a resulting (partially) photocurable silicone composition. The silicone functionality reactive with the acryloxy functionality of the silyl diacrylate capper may be located in any suitable portion of the silicone molecule, e.g., at the terminus of a silicone backbone, or as an end group of a pendant siloxy chain in the silicone molecule, or in any other portion of the silicone molecule which may be advantageously employed for such functionality. In addition, the reactive functionality of the silicone may be bonded to any suitable atom or group in the silicone molecule, e.g., to a silicon atom or other constituent atom or group in the molecule. Preferably, the reactive functionality is bonded to a silicone atom. In a preferred aspect, the silicone functionality which is reactive with the acryloxy functionality of the silyl diacrylate compound, comprises a so-called "active hydrogen" constituent, e.g., a functional group including a labile hydrogen constituent, with the proviso that such functional group is not hydrogen per se. Illustrative of potentially suitable functional groups for the silicone which are reactive with the acryloxy functionality of the silyl diacrylate capper, are the following functional groups:

—OH;
—N(R')$_2$, wherein each of the R' substituents is independently selected from hydrogen and organo groups, with the proviso that at least one R' substituent is hydrogen;
—SH; and
—SO$_3$H.

In instances where residual acrylic acid groups are present with the silyl diacrylate capper, deriving from the synthesis of such capper, the cappable silicone functionality may be constituted by a functionality of the formula:

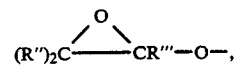

wherein each of the R" and R"' substituents is independently selected from hydrogen and organo groups.

Preferably the cappable reactive functionality of the silicone is hydroxyl.

It will be recognized that the foregoing species of functionality for the silicone are illustrative only and that any other functional groups which are reactive with the capper species employed, which are compatible with the constituents of the formulation in which the capped silicone ultimately is used, and which do not preclude the utility of the resulting photocurable silicone composition for its intended purpose, may advantageously be employed.

The silicone employed in the broad practice of the invention likewise may be of any suitable type, and for example may advantageously comprise a linear polydiorganosiloxane, or other linear silicone, having a weight average molecular weight which may for example range from about 700 to about 300,000, preferably from about 10,000 to about 80,000, and most preferably from about 10,000 to about 50,000.

Although the silicone which is reacted with the silyl diacrylate capper to form the acryloxy-functional capped silicone of the invention is preferably linear in conformation, other non-linear silicones, e.g., branched, cyclic, or macromeric, may potentially usefully be employed in the broad practice of the present invention. Preferably, the polysiloxane is predominantly linear in character.

The acryloxy-reactive functionality may be located in any suitable portion of the polysiloxane molecule, including terminal positions in linear polysiloxane molecules, or terminal positions of chains of siloxy units in the polysiloxane molecule, as well as pendant functional positions and positions in intermediate or interior moieties of the molecule, but preferably is a terminal functional group, and most preferably, the polysiloxane is a linear molecule both of whose terminal functional groups comprise acryloxy-reactive functional groups, e.g., terminal hydroxy groups. Thus, for example, the starting polysiloxane material may comprise a hydroxy-terminated polydiorganosiloxane, e.g., a hydroxy-terminated polydimethylsiloxane. Preferably the starting silicone is an organopolysiloxane whose organo substituents are predominantly methyl. A particularly preferred polysiloxane material which has been usefully employed in the practice of the present invention is a hydroxy-terminated polydimethylsiloxane of linear configuration, having a weight average molecular weight on the order of 28,000.

In like manner, the additional functionality imparting further curing modality capability to the silicone may be located in any suitable portion of the silicone molecule, including terminal portions of linear silicone molecules or terminal portions of siloxy chains in the silicone molecule, as well as pendant positions, and in intermediate or interior moieties of the molecule. The silicone may for example comprise an organopolysiloxane having one terminus constituted by an acryloxy functionality (in the product silicone material), or by an acryloxy-reactive functionality (in the molecule prior to capping thereof with the silyl diacrylate capper), and another terminus may comprise the additional functionality, or a precursor thereto (i.e., a functionality which is reactive with a co-reactant to provide the additional functionality which in turn imparts further curing modality capability to the product silicone material).

As mentioned, the silicone comprising the acryloxy-reactive functionality and additional functionality, may be macromeric in character, including polysiloxane resins having M, D, T, and/or Q siloxy units, with at least one acryloxy-reactive functionality per molecule, and preferably more than one acryloxy-reactive functionality per molecule, and at least one additional functionality imparting further modality curing modality capability to the molecule.

As used in the preceding paragraph, the terms M, D, T, and Q units refer to monofunctional, difunctional, trifunctional, and tetrafunctional siloxy units, respectively, as defined in U.S. Pat. No. 4,568,566 to L. A. Tolentino, at column 5, lines 51–55 thereof.

The silyl diacrylate capper and the silicone comprising acryloxy-reactive functionality and additional (further curing modality) functionality, may be utilized in any suitable porportion relative to one another, consistent with the number of acryloxy-reactive functional groups initially present on the silicone molecule, and the number of acryloxy functional groups ultimately desired in the capped silicone molecule.

In like manner, the silicone molecule may be functionalized in any suitable manner to provide for further curing modalities, beyond the radiation curability imparted by the acryloxy functionality in the capped silicone. In this respect, the starting silicone material may comprise functionality which is reactive with the silyl diacrylate capper as well as with other co-reactant(s) providing the additional curing modality or modalities. In such instances, where common "starting" reactive moieties of the silicone are employed, which are reactive with the silyl diacrylate capper as well as with the co-reactant(s) providing the additional functionality, it generally is preferred to utilize relative amounts of the capper and the silicone providing from about 0.10 to about 0.8 equivalents of acryloxysilyl functionality for reaction with the acryloxy-reactive functionality of the silicone, and from about 0.20 to about 0.90 equivalents of co-reactant functionality for reaction with such (acryloxy-reactive) functionality of the silicone.

The preferred multifunctionalized (polymodal-curing) silicones are those which are linear and have terminal and/or pendant (i) acryloxy functionality and/or (ii) additional functionality. They are generally represented by the following formula:

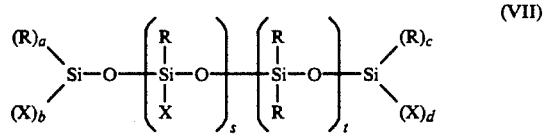

(VII)

wherein:
each R is independently a radical or moiety which is non-reactive in the end-use composition in which the silicone is to be employed, i.e., not reactive with the cure mechanisms to be employed in the end-use composition, e.g., each R may be hydrogen, halo, or organo, preferably organo selected from $C_1$–$C_8$ alkyl and phenyl, and most preferably methyl;

each X independently is (i) an acryloxy functionality derived from the silyl diacrylate capper, or (ii) an additional functionality which is dependent upon a desired further cure modality;
each of a, b, c and d is independently 0, 1, 2 or 3;
s is 0 or a positive integer, preferably less than 20, more preferably less than 8; and
t is a positive integer;
provided that:
(a+b)=(c+d)=3;
(b+d+s) is greater than or equal to 2; and
the equivalents ratio of (i) acryloxysilyl functionality to (ii) additional functionality is from 0.1:0.9 to 0.8:0.2, except where the end-use composition comprises a mixture of a silicone polymer of the above formula and a second constituent which cures by another curing modality, in which case the ratio may be up to 1.0:0.0.

It is understood that in any given silicone polymer chain of the above formula (VII), all X's may be (i) acryloxy functionality; (ii) additional functionality; or a mixture of the two.

After being polyfunctionalized, the acryloxy-functional capped silicone may be suitably combined with an effective amount of a photoinitiator for partial curing of the acryloxy-functional capped silicone under photoinitiating curing conditions, to yield a partially photocurable silicone composition. The polyfunctionalized silicone and the photoinitiator may be also be formulated with any compatible and efficacious curatives, initiators, accelerators, etc., as appropriate to the additional functionality providing further curing capability to the capped silicone molecule.

The photoinitiator which is utilized in the partially photocurable silicone compositions of the present invention may comprise any photoinitiator known in the art which is effective to cause curing of acrylic functionalities. These include photoinitiators such as benzoin, substituted benzoins such as benzoin ethyl ether, benzophenone, benzophenone derivatives, Michler's ketone, dialkoxyacetoxyphenones such as diethoxyacetophenone, acetophenone, benzil, and other derivatives (substituted forms) and mixtures thereof. A particularly preferred photoinitiator material is diethoxyacetophenone. Although any suitable effective amount of photoinitiator may be employed in the partially photocurable silicone compositions of the invention, generally the photoinitiator concentration will usefully be in the range of about 0.1% to about 10% by weight, and more specifically and preferably from about 0.2% to about 5% by weight, based on the weight of the acrylic functionality-capped silicone.

The photoinitiator employed in the partially photocurable silicone compositions of the present invention may also be polymer bound. Such photoinitiators are described in U.S. Pat. Nos. 4,477,326 and 4,587,276. Other free radical initiators, such as peroxy thermal initiators may be used in some of the lower molecular weight silicone formulations of the invention.

The compositions of the invention may also include other ingredients to modify the cured or uncured properties of the polymodal-curing compositions, as desired for specific end uses.

Fillers or reinforcing materials may usefully be employed in compositions of the present invention to provide enhanced mechanical properties, and in some instances enhanced UV radiation curability of the composition. Among preferred fillers are reinforcing silicas.

The reinforcing silicas are fumed silicas which may be untreated (hydrophilic) or treated so as to render them hydrophobic.

In general, fillers may be employed at any suitable concentration in the curable silicone composition, but generally are present at concentrations of from about 5% to about 45% by weight, based on the weight of the capped polyfunctionalized silicone. Generally, any other suitable mineralic, carbonaceous, glass, or ceramic fillers may be potentially advantageously employed. Examples include ground quartz, tabular alumina, diatomaceous earth, silica balloons, calcium cabonate, carbon black, titanium oxide, aluminum oxide, aluminum hydroxide, zinc oxide, glass fibers, etc.

In addition, the polymodal-curing silicone compositions may also optionally contain an adhesion promoter, to enhance the adhesive character of the composition for a specific substrate (e.g., metal, glass, ceramic, etc.), when the composition is employed as an adhesive for bonding, or as a sealant for sealing, of substrate elements. Any suitable adhesion promoter constituents may be employed for such purpose, depending on the specific substrate elements employed in a given application. For example, the adhesion promoter might be selected to enhance adhesion of the composition on substrates comprising materials such as metals, glasses, plastics, ceramics, and mixtures, blends, composites, and combinations thereof. Various organosilane compounds may be usefully employed for such purpose, and such compounds may also desirably feature oxirane functionality, as well as silicon-bonded alkoxy substituents, to provide broad adhesive bonding utility. In such organosilane compounds, the oxirane functionality may be provided by a glycidoxyalkyl substituent on a silicon atom of the silane compound. A particularly preferred adhesion promoter of such type is glycidoxypropyltrimethoxysilane.

In addition, further additives such as MQ or MDQ resins can be incorporated, to vary the properties of the silicone composition as desired.

Besides the constituents identified above as being optionally includable in the silicone compositions of the present invention, further optional constituents include: anti-oxidants; flame retardants; initiators, curatives, accelerators, etc., as required for the additional curing modality or modalities; pigments; etc., as well as filler adjuvants, e.g., filler-treating agents such as hydroxy-terminated vinylmethylsiloxane for filler treatment of quartz or similar fillers when used in the composition.

Depending on the composition, processing, and end use of the composition containing the polymodal-curing silicone of the present invention, any suitable sequence of curing steps can be carried out to effect curing of the silicone composition. Thus, the photocuring effected by radiation exposure of the composition can be carried out initially, prior to other curing step(s), or such radiation curing may take place as the final curing step, or alternatively such radiation curing may be an intermediate step in a series of three or more curing steps which are carried out to fully cure the silicone composition.

In general, however, it is preferred, particularly when the silicone composition is employed in coating, bonding, and potting applications requiring handling, assembly, or packaging immediately after the composition is applied, to initially cure the silicone composition by exposure to radiation and to provide photocurable acrylic functionality in sufficient quantity to immobilize the composition and render it amenable to such further handling, assembly, packaging, or other processing steps, in instances in which the subsequent curing step(s) are desirably or necessarily delayed until the completion of such "downstream" activity.

For example, using a composition according to the present invention, wherein the silicone is polyfunctionalized, for UV radiation exposure curing, and for ambient temperature curing (e.g., by functionalization with room temperature cure epoxy functionality), a part may be bonded, sealed, coated, or potted with the composition, irradiated to "set" the applied composition, and then further processed at ambient conditions. If already in finished form when the composition is applied, e.g., an electromechanical assembly which as a final step is potted with the composition, the structure bearing the radiation (partially) cured composition can be packaged so as to further cure in situ in the package, container, or end use assembly.

It is also within the purview of the present invention to utilize a capped silicone which is fully functionalized for radiation exposure curing only, and to utilize such material in combination with other formulation constituents which cure by some other curing modality, e.g., moisture curing, heat curing, anaerobic curing, etc. Thus, physical blends of different materials having different curing modalities are contemplated, as well as the use of a silicone material having polymodal curability per se. In addition, a polymodal curing silicone in accordance with the present invention may be utilized in combination with other materials having the same or different curing modalities.

Although the invention has been described hereinabove with particular reference to functionalizing a silicone with a silyl diacrylate capper, and with the silicone having further functionality imparting additional curing mode(s) thereto, which may be provided by functionalizing the silicone with other functional groups or moieties imparting further cure capability, it is also possible in the broad practice of the present invention to polyfunctionalize the silicone, using a single functionalizing (capping) material.

Further, a silicone composition in accordance with the present invention may be advantageously synthesized in some applications by fully capping the silicone with a silyl diacrylate capper, followed by reaction of a portion of the resulting acryloxy capping moieties with a less-than-stoichiometric amount of a co-reactant, yielding a reaction product capping moiety which imparts a further cure modality to the resulting silicone.

What is required in each instance, regardless of the synthesis methdology, is the provision of a partially photocurable silicone which is additionally functionalized for other cure mode(s).

The silicone compositions of the present invention may be partially cured by exposure to any radiation conditions which are curingly effective for the composition. Suitable radiant energy types which may be usefully employed include electron beam radiation, ultraviolet radiation, visible light radiation, gamma radiation, X-rays, $\beta$-rays, etc. Preferably, the photocuring radiation is actinic radiation, i.e., electromagnetic radiation having a wavelength of about 700 nm or less which is capable of effecting (partial) cure of the silicone composition. Most preferably, the photocuring radiation comprises ultraviolet (UV) radiation.

Curing may suitably be carried out in an ambient atmosphere or in an inert atmosphere such as argon or nitrogen. Exposure time required to partially cure the applied composition varies with such factors as the particular formulation used, type and wavelength of radiation, energy flux, concentration of photoinitiator, and thickness of the coating, but it is generally quite short, that is, less than about 3 minutes. Exposing the composition to excessive amounts of radiation may "overcure" the composition, resulting in poor physical and performance properties. The amount of radiation which is excessive varies with the given formulation, coating thickness, radiation source, etc., and may easily be determined by the skilled artisan without undue experimentation.

The depth of radiation penetration in the silicone composition will depend on the constituents, fillers, and other composition factors. Generally, in filled silicone compositions, the depth of radiation penetration is on the order of about 120 mils when ultraviolet light is used as the radiant medium.

In some instances, it may be feasible to photocure (radiation cure) the silicone composition without any constituent photoinitiator therein, however it generally is desirable to utilize a photoinitiator to initiate the curing of the acryloxy-functional capped silicone, by substantial polymerization thereof.

In a preferred synthesis of the acryloxy-functional silicone employed in the broad practice of the invention, the following sequence of reaction steps is carried out:

(a) reacting (i) an acrylic acid compound of the formula:

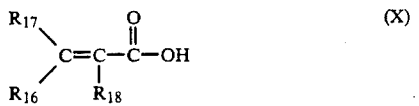

wherein: $R_{16}$, $R_{17}$, and $R_{18}$ are independently selected from hydrogen, halo, and organo radicals, with (ii) a chlorosilane compound of the formula:

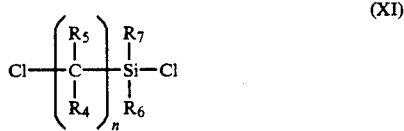

wherein:

$R_4$, $R_5$, $R_6$, and $R_7$ are independently selected from hydrogen, halo, and organo radicals; and n is an integer of from 1 to 4;

optionally in the presence of (iii) a basic hydrogen chloride acceptor, to yield a silyl diacrylate compound of the formula:

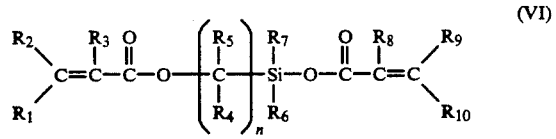

wherein: $R_1$, $R_2$, $R_3$, $R_4$, $R_5$, $R_6$, $R_7$, $R_8$, $R_9$, and $R_{10}$ are independently selected from hydrogen, halo, and organo radicals; and n is an integer having a value of from 1 to 4; and (b) reacting the silyl diacrylate compound with a silicone having (A) at least one functionality which is reactive with an acryloxy functionality of the silyl diacrylate compound, and (B) additional functionality imparting to the acryloxy-functional capped silicone at least one partial curing modality different from the partially curingly effective radiation exposure conditions constituting a first partial curing modality for the silicone.

In carrying out the reaction of the acrylic acid compound with the chlorosilane compound, it is generally advantageous to use a base such as triethylamine to function as a hydrogen chloride acceptor, thereby removing the hydrogen chloride formed in the reaction. The resulting hydrogen chloride/amine complex may then be filtered to remove the complex from the reaction mixture. In some instances, it may be feasible to remove the hydrogen chloride by-product by sparging the reaction mixture with nitrogen, whereby the passage of nitrogen gas through the mixture removes the hydrogen chloride.

It will be appreciated that the acrylic acid component employed in the above-described reaction scheme may comprise a mixture of compounds each of the general formula (X), e.g., a mixture of acrylic acid and methacrylic acid. Likewise, the chlorosilane co-reactant may be a mixture of chlorosilane species each of the general formula (XI) above, e.g., a mixture of chloromethyldimethylchlorosilane and chloromethyldiphenylchlorosilane. In such instances, the product silyl diacrylate will likewise comprise a mixture of corresponding differently substituted silyl diacrylate compound species.

It may also be desirable in some instances to carry out the acrylic acid/chlorosilane reaction so as to form a difunctional capper containing both acryloxy functionality and other functionality. For example, the reaction may be carried out using a mixture of acrylic acid and acetic acid for reaction with the chlorosilane, whereby the reaction product will include diacrylate capper of the general formula (VI) above, as well as capper compounds containing two acetoxy functionalities, and capper compounds containing both acetoxy and acryloxy functionality in the same molecule. In this manner, it is possible to use a mixture of silane cappers to polyfunctionalize the silicone in accordance with the present invention (e.g., for radiation curing of the acryloxy-functionalized silicone, and moisture-curing thereof by virtue of the acetoxy functionality).

Generally, and preferably, the reaction of the acrylic acid compound and the chlorosilane compound is conducted in a diluent medium, preferably a non-reactant hydrocarbon or halohydrocarbon, e.g., heptane. Generally, and preferably, the reaction volume is stirred during the reaction, such as may be accommodated by the provision of mechanical mixing means in the reaction vessel.

The reaction may be carried out at any suitable temperature; generally, temperatures on the order of from about 25° C. to about 100° C. are usefully employed, and preferably from about 25° C. to about the reflux temperature of the diluent medium in which the reaction is carried out, e.g., about 100° C. for heptane as the diluent medium. The time required to carry out the reaction may be readily determined for a given reaction system by simple analytical tests without undue experimentation, and the reaction time may be varied as necessary or desirable in a given application. By way of example, the reaction may be carried out in approximately 3-4 hours in a diluent medium of heptane at reflux temperatures. After the reaction has been carried out, the reaction mixture may optionally be subjected to vacuum stripping or other suitable treatment to effect removal of any residual (acrylic) acid constituents.

It will be appreciated that the synthesis methodology described above achieves a substantial advance in the art over the prior art practice of acrylic capping a silicone by reacting it with an isomeric mixture of acryloxypropenyldimethylchlorosilanes, as described hereinabove in the "Background of the Invention" section hereof. In that prior art synthesis, the generation of hydrochloric acid necessitates the addition of an amine in the process to function as the acid acceptor, resulting in a complexed amine hydrochloride solid which then must be filtered from the viscous capped silicone polymer, a step which is time-consuming, difficult, and costly. By comparison, in the synthesis methodology employed in the practice of the present invention and discussed above, the synthesis of the capper per se is associated with the generation of hydrogen chloride, which then becomes base (amine) complexed in the reaction mixture. However, in contrast to the filtration of the capped polymer which is required by the prior art synthesis method, the amine-complexed hydrogen chloride solid in the above-discussed methodology may readily be removed by filtration from the relatively low viscosity capper material, before the capper is reacted with the silicone, thereby achieving a significant advantage over the prior art methodology, in terms of processing time, ease of synthesis, and cost of the capped silicone product.

The features and advantages of the present invention are more fully illustrated by the following non-limiting examples, wherein all parts and percentages are by weight, unless otherwise expressly stated.

EXAMPLE 1

A 12 liter three neck round bottom flask, equipped with a mechanical stirrer, and condenser, was charged with 7.5 liters heptane. 720 ml acrylic acid, 1900 ml triethylamine and 616 g of chloromethyldimethylchlorosilane then were sequentially added to the heptane solution under nitrogen atmosphere. The mixture was stirred at 100° C. for 5 hours and then filtered and stripped to give 929 g of the crude acryloxymethyldimethylacryloxysilane. GC analysis indicated the crude material had a high purity of >90%. The crude product can be further vacuum distilled at 0.5 mmHg and ~70° C. to improve its purity, if necessary.

EXAMPLE 2

Acryloxymethyldimethylacryloxysilane was prepared in accordance with the general procedure of Example 1, but with the reaction product having an estimated purity of 70% of silyl diacrylate capper therein.

To 50 grams of silanol-terminated polydimethylsiloxane (viscosity=3500 cps), the following materials were sequentially added and mixed at room temperature.
(1) 5.5 grams of the silyl diacrylate capper;
(2) 8.6 grams of ethyltriacetoxysilane; and
(3) 2.5 grams of diethoxyacetophenone.

The resulting mixture, after de-airing, was photocured under a Fusion lamp using a H-bulb to give a soft gel, too soft to measure its hardness. After standing at ambient temperature for 1.5 hours, the material gave a durometer (00) reading of 35. After three hours, the hardness was 54, and after standing overnight the hardness increased to 65.

EXAMPLE 3

A silicone composition was made up in accordance with the procedure of Example 2. The uncured mixture when left in ambient condition formed a soft gel in 30 minutes. After standing overnight, the mixture cured to a soft rubber with a hardness of 13 (durometer (00) value). The soft rubber was further UV cured under the Fusion lamp to a hardness of 69.

The foregoing examples show that the silyl diacrylate compound was an effective capper for imparting UV radiation curable character to the silanol-terminated silicone, and that the ethyltriacetoxysilane capped the residual silanol functionality of the silicone to impart moisture curability to the polymer. In this manner, a silicone polyfunctionalized for UV and moisture curing was produced, and the resulting composition was effectively cured by initial radiation curing and final ambient moisture curing (Example 2), as well as by ambient moisture curing followed by UV radiation curing (Example 3).

EXAMPLES 4-6

Samples of acryloxymethyldimethylacryloxysilane prepared in accordance with the procedure of Example 1 were mixed in various ratios with a hydroxy-ended polydimethylsiloxane having a viscosity of 2000 cps., at room temperature for 15 minutes. To each mixed sample was further added 1.5% (w/w) diethoxyacetophenone. The mixtures then were cast as 75 ml films and irradiated for one minute per side with 70 mW/cm$^2$ UV radiation using a medium pressure mercury vapor lamp. The hardness values of the photocured films then were determined using a Shore 00 Durometer. Results are shown in Table I below, including the equivalents ratio of acryloxy functionality of the capper to acryloxy-reactive functionality of the silicone in each sample.

TABLE I

| Example | Wt of Capper (Example 1) | Wt of Silicone | Shore 00 Durometer Hardness | Equivalents Ratio |
|---|---|---|---|---|
| Example 4 | 1.8 g | 150 g | No cure | 0.5 |
| Example 5 | 2.7 g | 150 g | 28 | 0.75 |
| Example 6 | 3.6 g | 150 g | 57 | 1.0 |

While the invention has been described with reference to specific features and embodiment thereof, it will be appreciated that numerous variations, modifications, and alternative embodiments exist, and all such variations, modifications, and embodiments are to be regarded as being within the spirit and scope of the invention.

What is claimed is:

1. An acryloxy-functional capped silicone, formed as a non-hydrolysis reaction product of:
   (i) a silyl diacrylate compound of the formula:

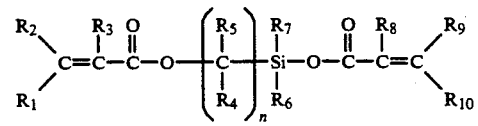

wherein:

$R_1$, $R_2$, $R_3$, $R_4$, $R_5$, $R_6$, $R_7$, $R_8$, $R_9$, and $R_{10}$ are independently selected from hydrogen, halo, and organo radicals; and n is an integer having a value of from 1 to 4; and (ii) a silicone having:

(A) functionality which is reactive with an acryloxy functionality of said silyl diacrylate compound to yield said acryloxy-functional capped silicone which is partially curable under first curing conditions comprising curingly effective radiation exposure optionally in the presence of a photoinitiator; and (B) additional functionality which renders said acryloxy-functional capped silicone partially curable by second curing conditions different from the curingly effective radiation exposure of the first curing conditions.

2. A composition according to claim 1, wherein $R_1$, $R_2$, $R_3$, $R_4$, $R_5$, $R_8$, $R_9$, and $R_{10}$ are independently selected from hydrogen, halo, and organo radicals, and $R_6$ and $R_7$ are independently selected from hydrogen, halo, phenyl, and $C_1$-$C_8$ alkyl radicals.

3. A composition according to claim 1, wherein n has a value of from 1 to 2.

4. A composition according to claim 1, wherein:

$R_1$, $R_2$, $R_9$, and $R_{10}$ are hydrogen;

$R_3$, $R_4$, $R_5$, and $R_8$, are independently selected from hydrogen and $C_1$-$C_8$ alkyl;

$R_6$, and $R_7$ are independently selected from phenyl and $C_1$-$C_8$ alkyl; and n is 1.

5. A composition according to claim 1, wherein:

$R_1$, $R_2$, $R_4$, $R_5$, $R_9$ and $R_{10}$ are hydrogen;

$R_3$ and $R_8$ are independently selected from hydrogen and methyl;

$R_6$ and $R_7$ are methyl; and n is 1.

6. A composition according to claim 1, wherein said silicone functionality, which is reactive with the acryloxy functionality of the silyl diacrylate compound, comprises a silicon-bonded functional group including a labile hydrogen constituent.

7. A composition according to claim 1, wherein said silicone functionality which is reactive with the acryloxy functionality of the silyl diacrylate compound, comprises a functionality selected from the group consisting of:

—OH;

—N(R')$_2$, wherein each of the R' substituents is independently selected from hydrogen and organo groups, with the proviso that at least one R' substituent is hydrogen;

—SH;

—SO$_3$H; and

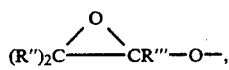

wherein each of the R″ and R‴ substitutents is independently selected from hydrogen and organo groups; with the proviso that said silicone functionality is

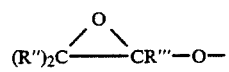

only when the silyl diacrylate compound is present with residual acrylic acid groups deriving from the synthesis of the silyl diacrylate compound.

8. A composition according to claim 1, wherein said silicone having functionality (A) which is reactive with an acryloxy functionality of said silyl diacrylate compound, and additional functionality (B), comprises a linear polydiorganosiloxane.

9. A composition according to claim 8, wherein said reactive functionality of said silicone comprises a terminal reactive functional group.

10. A composition according to claim 1, wherein said silicone having functionality (A) which is reactive with an acryloxy functionality of said silyl diacrylate compound, and additional functionality (B), comprises a linear silicone with hydroxy functional groups at its termini.

11. A composition according to claim 10, wherein said linear silicone has a weight average molecular weight of from about 700 to about 300,000.

12. A composition according to claim 1, wherein said additional functionality is selected from the group consisting of:

amino;
vinyl;
hydrogen;
enoloxy;
hydroxy;
alkoxy;
aryloxy;
oxime;
—OOCR$_{13}$;
N,N-dialkylamino;
N,N-dialkylaminoxy;
N-alkylamido;
—O—NH—C(O)—R$_{13}$;

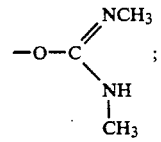

—O—C(CH$_3$)=CH$_2$; and
—S—C$_3$H$_6$Si(OCH$_3$)$_3$;

wherein R$_{13}$ is H or hydrocarbyl.

13. A composition according to claim 1, wherein said additional functionality (B) is selected from the group consisting of methoxy, oxime, and acetoxy.

14. A composition according to claim 1, wherein said silicone functionality (B) comprises silanol functionality, and said silanol functionality is reacted with a co-reactant comprising a silane of the formula:

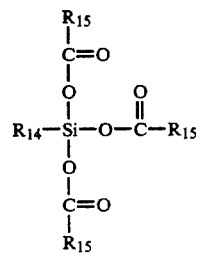

wherein:

R$_{14}$ is C$_1$-C$_8$ alkyl, or $$R_{15}-\overset{\overset{O}{\|}}{C}-O-;$$

and each $R_{15}$ is independently selected from hydrogen and $C_1$–$C_8$ alkyl.

15. A composition according to claim 1, wherein said silicone functionality (B) comprises silanol functionality, and said silanol functionality is reacted with a co-reactant comprising ethyltriacetoxysilane.

16. A composition according to claim 1, wherein said additional functionality (B) is curable by curing conditions selected from the group consisting of: (a) ambient temperature; (b) moisture exposure; (c) elevated temperature; (d) reaction with curative species; and (e) radiation exposure differing from the radiation exposure of the first curing conditions.

17. A composition comprising a capped silicone according to claim 1, and an effective amount of a photoinitiator for partial curing of said acryloxy-functional capped silicone under said radiation exposure first curing conditions.

18. A composition according to claim 17, wherein the photoinitiator comprises a compound selected from the group consisting of benzophenone, benzoin, acetophenone, benzil, and their substituted forms, and mixtures thereof.

19. A composition according to claim 17, wherein the photoinitiator comprises diethoxyacetophenone.

20. A composition according to claim 17, further comprising a stablizer.

21. A composition according to claim 17, further comprising a filler.

22. A composition according to claim 1, wherein said silyl diacrylate has the formula:

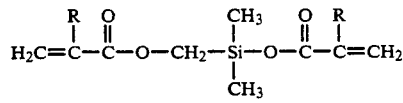

wherein:

R is H or methyl; and said silicone having functionality (A) which is reactive with an acryloxy functionality of said silyl diacrylate compound, and additional functionality (B), comprises a linear polydimethylsiloxane with terminal —OH groups.

23. A photocured silicone material produced by curing a composition comprising an acryloxy-functional capped silicone according to claim 1, under conditions curingly effective therefor.

24. A method of capping
(i) a silicone having
(A) functionality which is cappable by the silyl diacrylate compound of formula (I) below, and (B) additional functionality which renders, or is reactive with another component to yield a functionality which renders, the capped silicone partially curable by curing conditions other than radiation exposure,
with (ii) acrylic functionality to render the silicone photocurable in character,
said method comprising non-hydrolyzingly reacting the cappable functionality (A) of said silicone with a silyl diacrylate compound of the formula:

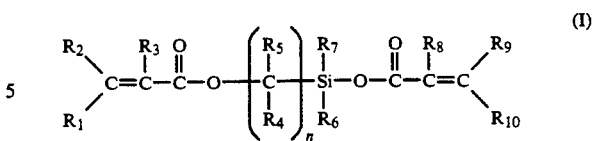

wherein:

$R_1$, $R_2$, $R_3$, $R_4$, $R_5$, $R_6$, $R_7$, $R_8$, $R_9$, and $R_{10}$ are independently selected from hydrogen, halo, and organo radicals, and n is an integer of from 1 to 4.

25. A method according to claim 24, wherein said silicone functionality (A) which is reactive with the silyl diacrylate compound, comprises a silicon-bonded functional group including a labile hydrogen constituent.

26. A method according to claim 24, wherein said silicone functionality (A) which is reactive with the silyl diacrylate compound, comprises a functionality selected from the group consisting of:

—OH;

—N(R')$_2$, wherein each of the R' substitutents is independently selected from hydrogen and organo groups, with the proviso that at least one R' substitutent is hydrogen;

—SH;

—SO$_3$H; and

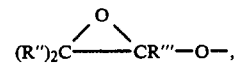

wherein each of the R" and R'" substitutents is independently selected from hydrogen and organo groups;

with the proviso that said silicone functionality is

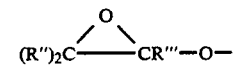

only when the silyl diacrylate compound is present with residual acrylic acid groups deriving from the synthesis of the silyl diacrylate compound.

27. A method according to claim 24, further comprising forming a photocurable silicone composition by mixing said acryloxy-functional capped silicone with a photoinitiator.

28. A method according to claim 27, wherein said photoinitiator is selected from the group consisting of benzophenone, benzoin, acetophenone, benzil, and substituted forms thereof, and mixtures thereof.

29. A method according to claim 27, wherein the photoinitiator comprises diethoxyacetophenone.

30. A method according to claim 27, further comprising exposing said photocurable silicone composition to radiation curingly effective therefor, to yield a photocured silicone composition.

31. A method according to claim 30, wherein said radiation comprises ultraviolet radiation.

32. A method according to claim 24, wherein said silyl diacrylate has the formula:

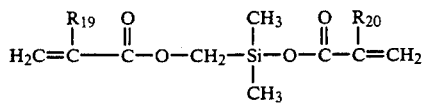
wherein:
R$_{19}$ and R$_{20}$ are independently selected from H and methyl; and
said silicone having functionality (A) which is cappable by the silyl diacrylate compound, and additional functionality (B), comprises a linear polydimethlysiloxane with terminal —OH groups.
* * * * *